UNITED STATES PATENT OFFICE 2,247,207

METHOD FOR TREATING LIGNOCELLULOSIC MATERIAL AND PRODUCT THEREOF

Arlie W. Schorger, Madison, Wis., assignor to Burgess Cellulose Company, Freeport, Ill., a corporation of Delaware No Drawing. Application November 25, 1938, Serial No. 242,327

12 Claims. (Cl. 106—203)

This invention relates to improved methods for the production of moldable products from natural lignocelluloses and the products produced thereby.

Objects of this invention are: to provide a new method of forming a solution of lignin in an organic solvent; to provide a new method for forming a concentrated lignin; and to produce a moldable lignocellulose which has a lower molding temperature and increased flow at the molding temperature.

When a natural lignocellulosic material is cooked with water at an elevated temperature alone or with added materials so that a part of the lignocellulosic material and particularly the hemicelluloses are rendered water-soluble, the residual material becomes thermoplastic and may be used in hot-molding operations to produce a hard, resinous material. The properties of the molding material can be modified by increasing the lignin content as by the removal of carbohydrates or by the addition of lignin as such. I have found that at least a part of the lignin of the molding material produced by such a water cook is soluble in many organic solvents. I have further used this discovery to produce a lignocellulose molding material of greatly increased flow and a lower molding temperature because the lignin so obtained has a lower softening point and differs in other respects from the lignin that is obtained by the action of strong mineral acids or alkalies on the natural lignocelluloses.

The basic plastic lignocellulose can be obtained by heating under pressure the natural lignocelluloses with water, preferably with the addition of a small amount of alkali to neutralize the acids formed, at temperatures of 160° to 200° C. The resultant washed and dried material is termed the "primary plastic." The water-washing removes the water-solubles such as carbohydrates and particularly the hemicelluloses which have been rendered soluble by the cooking treatment, thereby increasing the water-resistance of the molded product. The residual primary plastic product contains a large part of the original thermoplastic resinous lignin as well as cellulosic fiber intrinsically unchanged.

The raw material for the process is any natural lignocellulosic material such as wood, corncobs, straw, bagasse, cornstalks, etc. When a natural lignocellulosic material is referred to herein it includes manufactured products, such as newsprint, for example, which contains 70-90% of coniferous ground wood. The ground wood therein is substantially in its original or natural condition.

The time, temperature, and pressure used during the cooking operation may vary within limits depending upon the specific properties desired in the final product. During the cooking operation small amounts of the volatile acids, acetic and formic, are formed from the lignocellulose. When the acids are not neutralized there is loss of strength in the finished product, but the plasticity is increased somewhat. The latter effect can also be enhanced by the addition of small amounts of inorganic acids, such as sulfuric acid. It is preferable, however, to add prior to cooking sufficient alkali to neutralize the volatile organic acids formed during the cook, for example, 2% to 5% (of the air dried weight of the wood) of sodium carbonate or sodium hydroxide, depending upon the kind of lignocellulose used. These alkalies continuously neutralize the acid produced. Care should be taken that the alkalinity is not too great because the lignin may be attacked thereby decreasing the amount of binder available in the molding compound.

The invention described and claimed herein has for one of its purposes the rearrangement of the physical relationship between the lignin and the cellulose to increase the plasticity of the lignocellulose and also to improve the other physical properties. I have made the discovery that this may be effected by means of organic solvents for the lignin, the discovery having been made that the lignin in the primary plastic produced by a water cook is readily soluble in certain organic solvents. For example, when extracted with boiling 95% ethyl alcohol at atmospheric pressure, 15% to 20% of the air-dried primary plastic dissolves; with acetone 20% to 25%; and dioxane 30% to 35%. Evaporation of the solvent from such a solution leaves a residue consisting largely of lignin. When 5% to 20% of this lignin is added to the primary plastic the mixtures obtained flow readily under heat and pressure to form a dense and strong product. The solution of the lignin may be mixed with the primary plastic and the solvent evaporated or the dried lignin and primary plastic may be intimately mixed by mechanical means. It is also possible to improve the primary plastic by mixing the organic solvent with the primary plastic, allowing part of the lignin to dissolve and then evaporating the solvent from the primary plastic to deposit the dissolved lignin on it. Preferably, the amount of solvent should not be substantially in excess of the amount which is absorbed by the primary plastic whereby the solvent appears to dissolve a portion of the lignin, bringing it to the surface so as to uniformly coat the lignocellulose particles. The solvent may contain dissolved lignin derived from sources other than the primary plastic to be treated so as to increase the lignin content of the final plastic.

Suitable neutral organic solvents, when used alone or as mixtures, belong to the following classes though not confined to these: Alcohols: particularly the low boiling-point alcohols such as methyl, ethyl, propyl, butyl and amyl; ethylene glycol and glycerol, and their monomethyl, monoethyl and monobutyl ethers. Ketones: acetone; methyl ethyl ketone; diacetone alcohol; acetoacetic ester. Aldehydes: acetaldehyde; propaldehyde; furfural; aldol. Ethers: ethyl propyl ether; dioxane; methylal. Substituted hydrocarbons: chloroform; ethylene dichloride.

As previously indicated the solubility of the lignin varies in the solvents listed, for example, acetone and dioxane being relatively good solvents and glycerol being a relatively poor solvent. Therefore, all of the solvents listed may not be of importance commercially. A solvent for lignin is indicated as one which has an appreciable solvent action.

In contrast to the above named solvents, the following solvents are definitely non-solvents or are very poor solvents: diethyl ether, pinene, hexane, benzine, toluene and carbon tetrachloride.

The organic solvents used need not be anhydrous but may contain limited quantities of water. Because the lignin is not soluble in water it is obvious that the amount of water present in the organic solvent must be kept as small as practicable, less than 10% in most instances. The claims are limited to such a solution when a solution in an organic solvent is specified.

Aniline and similar aromatic amines usually in limited amounts, up to 10%, may be dissolved in the solvent and thereby introduced into the molding product. The solvent also is a convenient carrier for added natural or artificial resins, or for waxes such as paraffin and montan, and for drying oils such as linseed and tung.

The organic solvent extracted lignin also may be used as such and mixed with the ordinary fillers used in plastics, such as wood flour, to produce a thermoplastic molding mixture.

There may be present during the molding operation from 0.5% to 10.0% of water which tends to increase the plasticity of the molding mixture.

Following are specific examples which illustrate practical embodiments of our process so that those skilled in the art may practice it. The time of molding given is for articles about 0.10 to 0.20 inch thick. The invention is not limited to the specific examples.

1. The dry primary plastic, produced as hereinbefore described by cooking sawdust, wood chips or other natural lignocellulosic material in water, is extracted with acetone and the extract evaporated. Ten parts of the dry lignin recovered are intimately mixed, as by grinding, with ninety parts of primary plastic (preferably one which has not been extracted) and one part of zinc stearate and molded at a temperature of 185° C. and a pressure of 3,500 pounds to the square inch.

2. Fifty parts by weight of a solution of dioxane extract of a primary plastic containing five parts of lignin is intimately mixed with ninety parts of finely ground primary plastic (preferably one which has not been extracted) and one part of zinc stearate. The solvent is removed by evaporation and the residue is molded under heat and pressure as in Example 1.

3. The mixture of lignin, primary plastic and zinc stearate of Example 1 (101 parts) is ground intimately with five parts of aniline and molded as specified in Example 1.

4. One part of powdered primary plastic is agitated with two parts, by weight, of acetone and the acetone evaporated. The residue is molded at a temperature of 185° C. at a pressure of 3,500 pounds to the square inch.

5. Fifty parts by weight of lignin extracted by means of an organic solvent such as ethanol are mixed intimately with fifty parts of a filler (wood flour, primary plastic and the like) and molded under heat and pressure.

I claim:

1. The step in the method for producing a thermoplastic lignocellulosic material capable of being hot-molded under pressure into a hard water-resistant and resin-like product which comprises depositing on a thermoplastic lignocellulosic material sufficient lignin derived from a solution of lignin in an organic solvent thereof to increase the plasticity of said lignocellulosic material during hot-molding.

2. The step in the method for producing a thermoplastic lignocellulosic material capable of being hot-molded under pressure into a hard, water-resistant and resin-like product which comprises depositing from a solution in an organic solvent for lignin upon particles of a natural lignocellulosic material which has been cooked by water at a temperature sufficiently elevated to render it thermoplastic, sufficient lignin to increase the plasticity of said lignocellulosic material during hot-molding.

3. The method of claim 2 in which the deposited lignin has been derived from the product of a substantially neutral hydrolysis of a natural lignocellulose.

4. The method of claim 2 in which the cooked natural lignocellulosic material has been washed with water to remove water solubles.

5. The method of claim 2 in which the solvent is one taken from the group consisting of alcohols, ketones, aldehydes, ethers and substituted hydrocarbons capable of dissolving appreciable amounts of said lignin.

6. The method for producing a thermoplastic lignocellulosic material capable of being hot-molded under pressure into a hard, water-resistant and resin-like product which comprises mixing a solution of lignin in an organic solvent with dry particles of a natural lignocellulosic material which has been cooked by water at a temperature sufficiently elevated to render it thermoplastic and washed thereafter to remove water solubles therefrom, and removing said organic solvent from said mixture without removing the lignin from said mixture, the lignin in said solution being derived from a source different than the lignocellulose material onto which the lignin is deposited and being sufficient in amount to increase the plasticity of said lignocellulosic material during hot-molding.

7. The method for producing a thermoplastic lignocellulosic material capable of being hot-molded under pressure into a hard, water-resistant and resin-like product which comprises mixing a neutral organic solvent for lignin with particles of a primary plastic produced by water-cooking a natural lignocellulosic material at a temperature sufficiently elevated to render it thermoplastic, washing with water to remove water solubles and drying, and thereafter removing said organic solvent from said mixture without removing the lignin from said mixture.

8. The method of claim 7 in which the amount of organic solvent used is substantially entirely absorbed by the dry primary plastic.

9. The method of producing a thermoplastic material capable of being hot-molded under pressure into a hard, water-resistant and resin-like product which comprises depositing lignin from a solution in an organic solvent therefor upon a powdered filler, said solution having been obtained by extracting with an organic solvent for lignin a primary plastic produced by cooking a natural lignocellulosic material with water at a temperature sufficiently elevated to render said lignocellulosic material thermoplastic.

10. The product resulting from the method of claim 6.

11. The product resulting from the method of claim 7.

12. The method for producing a thermoplastic lignocellulosic material capable of being hot-molded under pressure into a hard, water-resistant, resin-like product which comprises cooking a natural lignocellulosic material with water at a temperature sufficiently elevated to render said lignocellulosic material plastic, washing said cooked material with water and drying said washed material, mixing with said dried material a neutral organic solvent for lignin, and thereafter removing said organic solvent from said mixture without removing the lignin from said mixture.

ARLIE W. SCHORGER.